United States Patent [19]

Smith

[11] Patent Number: 5,000,430

[45] Date of Patent: Mar. 19, 1991

[54] THRUST STOP END ATTACHMENT ASSEMBLY FOR A TWISTED ROPE TORSION BAR

[75] Inventor: Jack E. Smith, Dayton, Ohio

[73] Assignee: General Motors Corporation, Detroit, Mich.

[21] Appl. No.: 393,152

[22] Filed: Aug. 14, 1989

[51] Int. Cl.$^5$ .................. B60G 11/18; F16F 1/36; F16F 1/14
[52] U.S. Cl. .................... 267/273; 267/148; 267/154
[58] Field of Search ............ 267/154, 155, 188, 189, 267/273, 275, 279, 148, 149, 25–27; 280/662, 664, 665, 679, 684, 695, 700; 464/97, 51, 54, 56–58, 155, 181, 182, 903

[56] References Cited

U.S. PATENT DOCUMENTS

| | | | |
|---|---|---|---|
| Re. 32,878 | 2/1989 | Leonard | 267/154 X |
| 2,346,426 | 4/1944 | Hait | 464/58 |
| 3,104,096 | 9/1963 | Eirhart | 280/721 X |
| 3,239,267 | 3/1966 | Camossi | 267/154 |
| 3,856,289 | 12/1974 | Steele | 267/154 |
| 4,781,364 | 11/1988 | Finn et al. | 267/273 X |

FOREIGN PATENT DOCUMENTS 0547574 2/1977 U.S.S.R. ............. 267/273
0459575 1/1937 United Kingdom ........ 267/154

Primary Examiner—Robert J. Oberleitner
Attorney, Agent, or Firm—Ronald L. Phillips

[57] ABSTRACT

An end attachment assembly for a twisted rope torsion bar includes an anchor nut having a spiral bore cooperatively receiving and positively engaging the outer contour of the torsion bar. The grooves of the spiral hole promote holding contact between the anchor nut and the torsion bar but allow relative movement to minimize stress build-up; a lightweight glass fiber/epoxy composite material is preferred for fabrication of the torsion bar. A thrust stop is provided to prevent the nut from being forced off the end of the torsion bar in response to axial forces created by the sliding movement of the torsion bar within the spiral bore. The thrust stop is made of elastomeric material and is integrally molded onto the end of the torsion bar. The thrust stop has a tapered body to cooperatively engage with a tapered opening in the anchor nut. Advantageously, the thrust stop tightly engages the anchor nut to limit axial motion of the anchor nut and convert a portion of the thrust into compressive forces promoting tighter contact between the thrust stop and the torsion bar under increased torque.

2 Claims, 2 Drawing Sheets

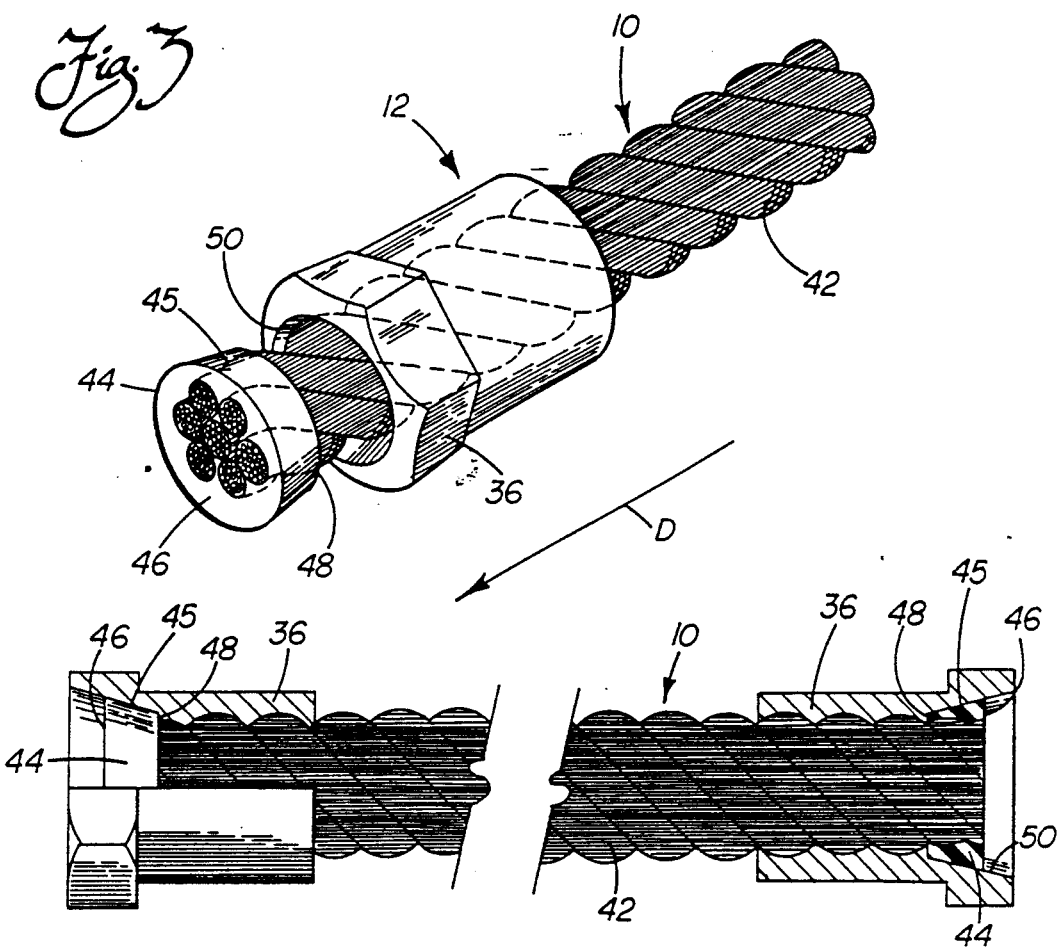
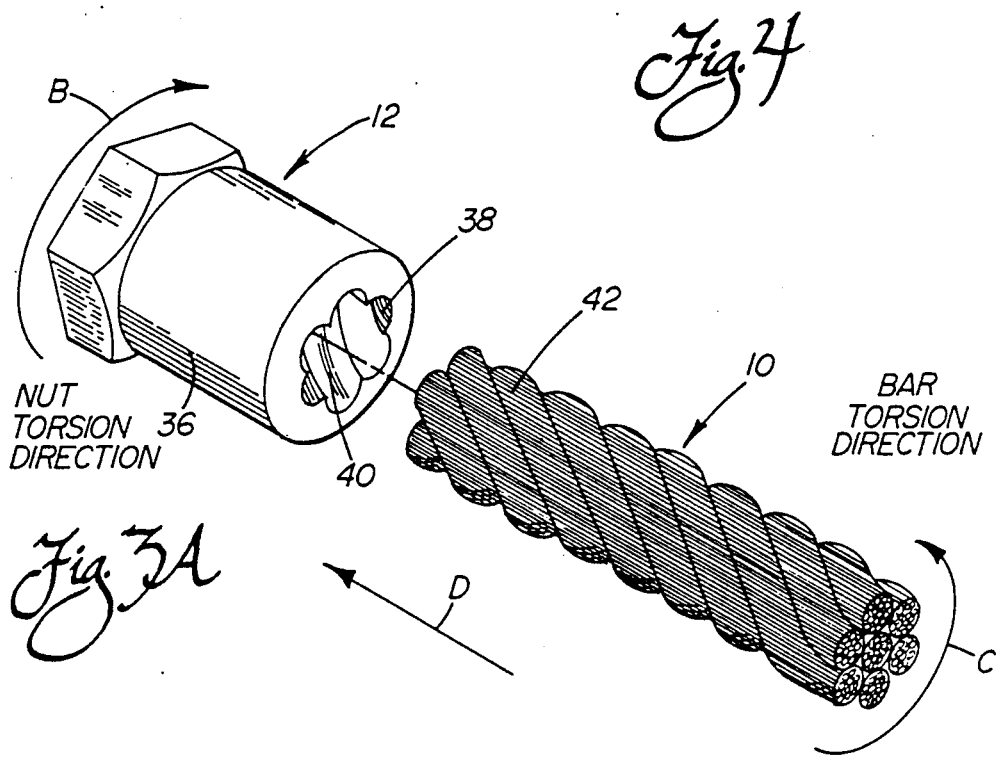

THRUST STOP END ATTACHMENT ASSEMBLY FOR A TWISTED ROPE TORSION BAR

TECHNICAL FIELD

The present invention relates generally to an end attachment assembly for a torsion bar, and more particularly to an assembly specifically adapted for use with a torsion bar fabricated of lightweight resin coated glass fibers and formed in the shape of a twisted rope.

BACKGROUND OF THE INVENTION

Mechanical springs are widely used to serve a variety of functions, such as exerting a resilient force, providing flexibility, and storing and absorbing energy. One type of mechanical spring that has found many uses is a torsion bar.

In general, torsion bars are straight bars made of inherently resilient or elastic material, and designed to be subjected to torsional loading, i.e. twisting about its longitudinal axis. The torsion bar is usually solid and circular in cross-sectional configuration, but may also be of square or rectangular cross-section. Torsion bars have many applications; one well-known use being in automotive vehicle suspension systems.

Historically, torsion bars have been fabricated out of metal, such as steel. This provides the desired strength and durability, but does not provide the ideal resiliency due to its high modulus of elasticity. As the cost of component parts for automotive vehicles continues to rise and the need to save weight to meet governmental standards for improved gas mileage increases, the need arises to design a less expensive and lighter torsion bar. To compliment this goal, designers are continuing to create a torsion bar fabricated of a material with a low modulus of elasticity. A material found to meet the dual requirements of providing high elasticity and sufficient strength is a composite material made of resin coated glass fibers. The use of this material provides a lightweight product that is cost effective. A further advantage is that such a composite material alleviates the critical availability of metal alloys.

A problem has always existed in connecting torsion bars to any mass to be sprung due to the significant stresses existing at the connection regions. Thus, there is a need to improve the connection used in incorporating the new generation torsion bar fabricated of glass fiber/epoxy composite material into the suspension system of a vehicle. Most of the operating components of a vehicle suspension system are fabricated of metal to provide strength. It is thus anticipated that opposing ends of a torsion bar would cooperate with metal components of significant strength and mass.

It is recognized that the desirable elasticity characteristic of a torsion bar providing the amount of deflection necessary to respond to vehicle motion conflicts with the strength requirement needed for use as attachments to the vehicle suspension system. The attachment component requires a high modulus of elasticity to introduce strength to the connection. Strength is inherently reduced when a torsion bar is required to have the necessary elasticity to perform its function.

One approach used in the art involves securing a torsion bar fabricated of composite material directly to a metal mounting piece. The torsion bar normally has a tubular configuration and is fitted into a tubular socket in the anchor. This type of direct attachment produces major problems since the torsion bar fabricated of composite material tends to deflect much more than the metal mounting piece when torque is applied, resulting in the tendency for a shear failure at the attachment interface.

As torsion bars are designed to be increasingly resilient, the attachment design becomes more critical. More specifically, an attachment design is desired to provide the required strength to the connection while mitigating the relative difference in angular deflection between the torsion bar and the attachment anchor. By alleviating the problems associated with the relative deflection difference, the stress concentration between the torsion bar and the anchor attachment is reduced, thus reducing the chance of failure of the torsion bar.

A further improvement in the design of torsion bars for automotive vehicle suspension systems and other uses has involved using a bundle of resin coated glass fibers formed into a rod-like shape. Several rod-shaped fiber bundles are then twisted together and set in to a rope-like configuration. This produces a twisted rope torsion bar fabricated of lightweight glass fiber/epoxy composite material incorporating the benefits of increased elasticity and resilience offered by the composite material with the higher load capacity offered by the twisted rope configuration. It should be appreciated that while the twisted rope configuration introduces benefits associated with elasticity and resilience, the improved design presents further complications with respect to the attachment component. The uneven non-circular surface of the twisted rope torsion bar increases the difficulty of providing a grip sufficient to allow optimal transmission f torque while minimizing the chance of shear failure at the attachment interface. An improved attachment design is thus needed to allow the twisted rope torsion bar to optimally cooperate with a metal mounting piece and at the same time maintain the reduced stress levels at the attachment interface.

SUMMARY OF THE INVENTION

Accordingly, it is a primary object of the present invention to provide an end attachment assembly for a twisted rope torsion bar allowing harmonious interaction between the twisted rope torsion bar and a sprung mass.

It is still another object of the present invention to provide an end attachment assembly including a nut forming an anchor whose bore has an internal surface that cooperatively mates with the non-circular surface of the twisted rope torsion bar.

Still another object of the present invention is to provide an end attachment assembly for a twisted rope torsion bar including a nut forming an anchor whose receiving bore has a dimension substantially the same as the non-circular outer contour of the twisted rope torsion bar. Advantageously, the relative fit provides sufficient clearance for assembly by relative twisting action while preserving the desirable holding contact between adjacent surfaces when torque is applied in a working environment.

It is another object of the present invention to provide an end attachment assembly for a twisted rope torsion bar allowing sufficient holding contact between the anchor nut and the torsion bar while limiting relative axial motion, thereby maximizing the torsional loading efficiency of tee torsion bar.

Another object of the present invention is to provide an end attachment for a twisted rope torsion bar including a thrust stop integrally molded onto the end of the torsion bar to provide retention of the anchor nut on the torsion bar in response to axial forces generated by the interacting surfaces of the internal bore of the anchor nut and the external surface of the torsion bar.

It is an additional object of the present invention to provide an end attachment assembly for a composite, twisted rope torsion bar with a thrust stop preventing relative axial motion between the anchor nut and the torsion bar and simultaneously exerting a compressive force on the end of the torsion bar.

Additional objects, advantages and other novel features will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an end attachment assembly for a twisted rope torsion bar for use in springing a mass is provided. The end attachment assembly offers the desirable qualities of providing positive interaction between the twisted rope torsion bar and the sprung mass and stress reduction capability at the attachment interface.

Advantageously, the end attachment includes an anchor or end nut adapted to engage components of the sprung mass. Since the well-known use of a torsion bar is in an automotive vehicle suspension system, the description that follows focuses on that use. It should be appreciated, however, that the end attachment assembly can be successfully used to connect the twisted rope torsion bar for other applications.

The anchor nut of the assembly is designed to be secured to the vehicle suspension system so that it is retained in a substantially rigid position with respect to angular rotation. It is this rigid engagement that allows torque to be readily transmitted to or taken from the assembly by the torsion bar.

The end attachment assembly of the present invention is contemplated as being used with a torsion bar fabricated from resin coated and twisted glass fibers. The composite material used to fabricate the torsion bar affords increased elasticity and resilience due to its low modulus of elasticity. The twisted rope orientation of the torsion bar gives a desired degree of strength to the torsion bar. When installed in the working environment, such as in the vehicle suspension system, the torsion bar is preloaded by providing an initial twist sufficient to insure a positive spring action over the expected range of travel.

In accordance with an important aspect of the invention, the anchor nut is fabricated with a spiral receiving bore or hole matching the external profile of the torsion bar. The dimensions of the spiral bore are substantially the same as the outer contour of the torsion bar, thus providing a close fit following assembly. The close relative fit furnishes sufficient clearance to allow the anchor nut to be twist-assembled onto the end of the torsion bar. It is anticipated that the twist assembly of the anchor nut to the torsion bar requires a moderate amount of twisting force. The resilient/compressive nature of the torsion bar effectively eliminates the chance of permanent damage during the initial assembly process.

The closeness of the fit between the anchor nut and the torsion bar allows for holding contact to be maintained between the end attachment assembly and the torsion bar while in use in a working environment, thus maximizing the torsional loading efficiency of the torsion bar. More specifically, the spiral bore is broached into the anchor nut to desirably provide enough clearance to allow twist-on assembly, while at the same time having sufficient interlock between adjacent surfaces of the anchor nut and torsion bar to maintain positive contact in the presence of applied torque. Since no physical bond exists between the twisted rope torsion bar and the interior, complimentary bore of the anchor nut, a slight amount of relative movement is allowed. At the same time, the relative fit between the anchor nut and torsion bar provides a grip sufficient to promote torque to be transmitted between them in an efficient manner and eliminating any tendency for catastrophic failure.

An additional benefit is provided by the cooperative mating between the spiral bore and the outer contour of the twisted rope torsion bar. When torque is applied to the torsion bar in a working environment, stresses build up at the connection interface with the end attachment assembly. These harmful stresses are reduced by the slight sliding action of the torsion bar in the spiral bore of the anchor nut. More specifically, it can be visualized that the diameter of the twisted rope torsion bar shrinks slightly when torque is applied. This radial motion is accompanied by a slight axial motion imparted to the braids of the twisted rope in the direction towards the end of the torsion bar. The mating spiral shape of the anchor nut bore allows the braids of the twisted rope torsion bar to slide along a guiding path. This cooperating action between the components reduces the frictional resistance encountered by the twisted rope torsion bar as its dimensions change within the anchor nut in the presence of applied torque.

The service life of the torsion bar is favorably affected by this relationship. According to an important aspect of the invention, a thrust stop is provided to prevent separation of the anchor nut due to this relative sliding action with respect to the torsion bar. As the braids of the twisted rope torsion bar slide in the grooves of the spiral bore in the anchor nut, an axial force is transmitted to the anchor nut. This force tends to drive or pull the anchor nut towards the end of the torsion bar. This relative axial motion of the anchor nut on the torsion bar during use is favorable, as noted above, but must be limited to prevent detachment of the anchor nut. The thrust stop is provided to do this by limiting the relative axial motion between these components.

Advantageously, the thrust stop is fabricated of elastomeric material and is integrally molded onto the end of the twisted rope torsion bar. The thrust stop is thus positioned to optimally allow slight relative motion between the torsion bar and the anchor nut to aid in reducing the shear stresses at the attachment interface while providing a limit to the relative motion to maximize the torsional loading efficiency of the torsion bar.

In accordance with a further aspect of the invention, the thrust stop is fabricated with a tapered body; that is, it narrows as it penetrates deeper into the anchor nut. The nut has a matching tapered opening; that is, it widens towards the outer surface of the head. It can be appreciated that the mating tapered design influences the anchor nut to impart a compressive force on the thrust stop. The elastomeric nature of the thrust stop allows it to more effectively compress around the torsion bar in response to this compressive force. This advantageously results in a reduction of the stresses at the critical end portion of the torsion bar. The compression of the elastomeric thrust stop proportionally increases its holding force as the torque is increased. Also, the shear resistance of the thrust stop itself is increased as it is compressed.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing:

FIG. 3 is an enlarged perspective view of the end attachment assembly according to this invention in a partially exploded view, for clarity;

FIG. 3A is enlarged perspective view of the end attachment assembly according to this invention is a disassembled condition, but shown from the opposite direction from that of FIG. 3; and FIG. 4 is a side view of the torsion bar with the end attachment assemblies according to this invention at opposing ends broken away and in partial and full cross-section.

Reference will now be made in detail to the present preferred embodiment of the invention, an example of which is illustrated in the accompanying drawing.

DETAILED DESCRIPTION OF THE INVENTION

Figure 1:
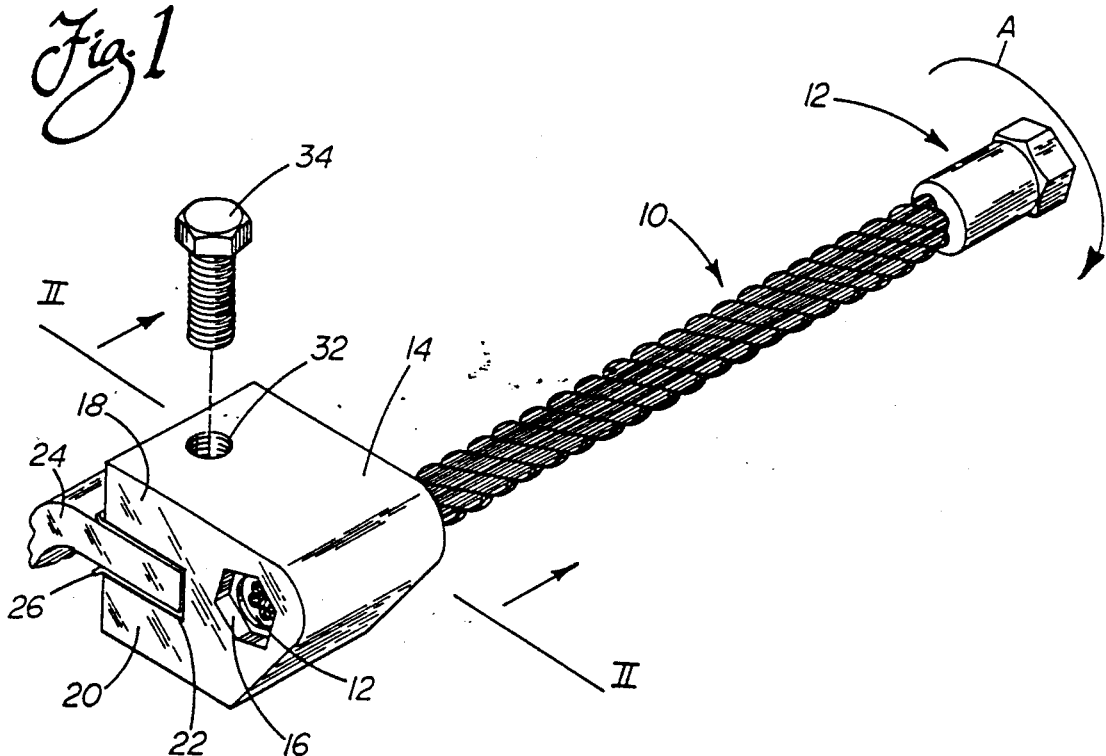
FIG. 1 is a perspective view of a twisted rope torsion bar attached at one end to a mounting block of a sprung mass and further showing at the opposite end an end attachment assembly according to this invention in full view.
Figure 2:
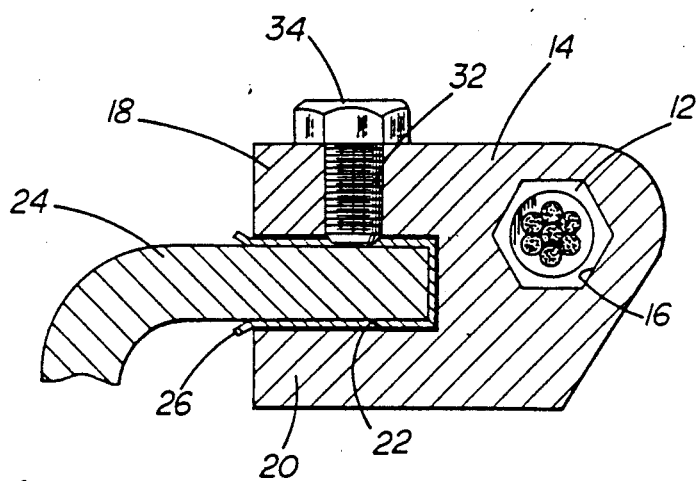
FIG. 2 is a cross sectional view taken generally along the plane indicated by lines II—II in FIG. 1.

Reference is now made to the drawing and particularly to FIG. 1 where a twisted rope torsion bar 10 appears as a component in a system for springing a mass, such as in a vehicle suspension system. An end attachment assembly, generally designated as 12, cooperates with the torsion bar 10 and serves to connect the torsion bar with another component of the system containing the sprung mass. The assembly 12 is shown securing the proximal end of the torsion bar 10 to a mounting block 14 having a mounting bore 16 that is cooperatively shaped. That is, the assembly 12 is hexagonally shaped to be retained within a hexagonal bore 16 in the mounting block 14, thus foreclosing relative rotation between the torsion bar 10 and the mounting block 14.

The mounting block 14 may take any suitable form, such as including upper and lower legs 18, 20 in spaced relation defining a slot 22 for cooperatively receiving a mounting web 24. A U-shaped clip 26 envelopes the mounting web 24 and assists in providing a secure engagement within the mounting block 14.

The mounting block 14 also includes a threaded aperture 32 adapted to receive a bolt 34. The force exerted by the base of the bolt 34 as the bolt 34 is threadingly tightened into the mounting block 14 provides further positive retention of the mounting web 24 within the slot 22.

Another end attachment assembly 12 is also shown in full perspective view attached to the opposite or distal end of the twisted rope torsion bar 10 in FIG. 1. It can be appreciated that if the distal end of the torsion bar 10 is attached to a support precluding any rotational movement, the load applied to the torsion bar 10 comes only from motion associated with the mounting web 24 at the proximal end of the torsion bar 10. The loading provided by the mounting web 24 is in one direction, such as counter to the weight and normal springing action of the vehicle. Advantageously in this situation, the torsion bar 10 is preloaded in the same direction as the anticipated applied torque. More specifically, during assembly, the torsion bar 10 is twisted beyond the zero torque or relaxed position. This provides the necessary support and the spring action over the full range of anticipated travel during use.

It can be visualized that the distal end attachment assembly 12 of FIG. 1 is secured to another mounting block cooperating with a torque input means, thus imparting the torque described by action arrow A.

Reference is now made to FIGS. 3 and 3A where the preferred embodiment of the end attachment assembly 12 is more clearly shown. The end attachment assembly 12 includes an anchor or end nut 36. According to an important aspect of the invention, the anchor nut 36 includes a spiral receiving bore 38 cooperatively matching the outer contour of the twisted rope torsion bar 10. More specifically, as best shown in FIG. 3A, the spiral bore 38 includes grooves 40 broached in the anchor nut 36 to mate with raised braids 42 of the twisted rope torsion bar 10.

The dimensions of the spiral bore 38 are substantially the same as the dimensions of the outer contour of the twisted rope torsion bar 10. The relative fit between the bore 38 and the torsion bar 10 optimally provides sufficient clearance to permit twist-on assembly while allowing sufficient contact between the bore 38 and the torsion bar 10 to be maintained when torque is applied in the working environment. The twist assembly of the anchor nut 36 on the torsion bar 10 requires a moderate amount of twisting force.

The advantage provided by the cooperating fit between the spiral bore 38 and the torsion bar 10 is further enhanced when considering the response of the torsion bar 10 to the application of torque. It can be appreciated that when torque is introduced to the torsion bar 10, its diameter shrinks slightly. In turn, the lead angle of the rope braids 42 increases slightly with respect to the plane perpendicular to the axis of the torsion bar 10. This results in a tendency for the torsion bar 10 to slightly move in an axial direction. The grooves 40 of the spiral bore 38 provide a path to receive and guide the rope braids 42 as this axial motion occurs. The allowance for the slight axial movement aids in reducing the stress build-up at the attachment interface between the anchor nut 36 and the torsion bar 10. At the same time, holding contact is positively maintained through the spiral interlock between the bore 38 and the torsion bar 10, maximizing the torsional loading efficiency.

The axial motion of the torsion bar 10 as it responds to the application of torque also imparts an axial force on the anchor nut 36 in the same direction of sliding movement along the grooves 40. Since the application of positive torque in the working environment requires the torsion bar 10 to twist in only one direction, the axial motion of the anchor nut 36 on the torsion bar 10 is required to be in only one direction in response thereto. It can be visualized that this axial motion and the associated axial forces are directed toward the end of the torsion bar 10, described by action arrow D in FIGS. 3 and 3A. These axial forces tend to urge the anchor nut 36 off the end of the torsion bar 10. It can be appreciated that as the torsion bar 10 continues to be increasingly torqued, the anchor nut 36 is forced farther toward the end.

According to a very important aspect of the invention, a thrust stop 44 is provided to limit this axial movement of the anchor nut 36. Advantageously, the thrust stop 44 is fabricated of elastomeric material. The use of elastomeric material is beneficial in that when engaged by the anchor nut 36, the thrust stop 44 provides sufficient resiliency to promote the transmission of torque while reducing the stress concentration. Additionally, the thrust stop 44 aids in protecting against the disadvantageous effects resulting from the frictional heat generated by the twisting movement between the anchor nut 36 and the torsion bar 10.

In order to provide the best results for limiting axial movement of the anchor nut 36, the thrust stop 44 is integrally molded onto the end of the torsion bar 10. An extremely secure bond is formed between the thrust stop 44 and the torsion bar 10 fabricated of composite material due to the positive bonding characteristic common to both components when pressed together in the presence of sufficient heat. Additionally, the uneven nature of braided surface as well as the twisted outer fibers of the braids 42 themselves enhance the security of the bond between the thrust stop 44 and the torsion bar 10. The bond thus formed eliminates slippage between the thrust stop 44 and the torsion bar 10 and provides positive resistance against the anchor nut 36 being forced against it when torque is applied in a working environment.

According to a very important aspect of the invention, the thrust stop 44 has a tapered body 45, narrowing from its broadest diametral dimension at the outer planar surface 46 to its narrowest diametral dimension at the inner planar surface 48 (see FIGS. 3 and 4). The anchor nut 36 has a matching tapered opening, designated as 50 (see FIG. 3) for cooperatively engaging the thrust stop 44. While the preferred embodiment contemplates the cooperating tapered design, it can be appreciated that the thrust stop can take other shapes. For instance, the thrust stop 44 may have an inner planar surface 48 that is not received by an opening in the anchor nut 36, but simply abuts it in planar relation.

However, the cooperating tapered design positively promotes tight engagement between the thrust stop 44 and the anchor nut 36. The design provides an additional important advantage by partially converting the thrust exerted by the anchor nut 36 to the thrust stop 44 into compressive forces on the thrust stop 44. Advantageously, the elastomeric nature of the thrust stop 44 allows it to tighten around the torsion bar 10 in response to the compressive forces exerted on the thrust stop 44 as the anchor nut 36 tends to ride up the taper of the thrust stop 44. This also aids in maintaining a solid contact between the thrust stop 44 and the torsion bar 10 as the diameter of the torsion bar 10 shrinks in response to applied torque. In this manner, stress concentrations at the end of the torsion bar are reduced. Additionally, the compression of the thrust stop 44 tends to increase the shear resistance of the thrust stop 44 itself.

In summary, numerous benefits result from employing the concepts of the present invention. The end attachment assembly 12 includes an anchor nut 36 having a spiral bore 38 matching the outer spiral contour of the twisted rope torsion bar 10. Advantageously, the relative fit between the bore 38 and the bar 10 promotes twist-on assembly while allowing sufficient contact to be maintained between the nut 36 and the torsion bar 10 when torque is applied to the torsion bar 10 in a working environment.

Since the anchor nut 36 tends to be forced off the end of the torsion bar 10 in response to axial forces generated when torque is applied to the torsion bar 10, the elastomeric thrust stop 44 is provided to limit this action. The thrust stop 44 is integrally molded onto the end of the torsion bar 10 to further provide positive resistance to the axial motion of the nut 36. Advantageously, the thrust stop 44 has a tapered body 45 to cooperatively mate with a tapered opening 50 in the anchor nut 36 into which it is received. The cooperating tapered design beneficially converts a portion of the thrust exerted by the nut 36 on the thrust stop 44 into compressive forces, thereby promoting a tight grip around the extreme edge of the torsion bar 10 as it shrinks when torque is applied. This arrangement also aids in reducing the stress concentrations and thus reduces the potential for torsion bar failure.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. An end attachment assembly for a twisted rope torsion bar comprising:
   an anchor nut for connection to a mounting means of a sprung mass;
   means for attaching said anchor nut to said twisted rope torsion bar, including a spiral bore in said anchor nut for cooperatively receiving and positively engaging said twisted rope torsion bar;
   said torsion bar being received in said bore so as to allow limited relative axial movement to minimize stress build-up; and
   means for compressing said torsion bar adjacent said anchor nut, whereby secure engagement is continuously maintained between said anchor nut and said twisted rope torsion bar to promote maximum torsional loading, and separation of said attachment assembly from said torsion bar is prevented.

2. A thrust stop end attachment assembly in combination with a twisted rope torsion bar comprising:

an anchor nut connecting to a mounting means for a sprung mass;

means for attaching said anchor nut to said twisted rope torsion bar, including a spiral bore in said anchor nut for cooperatively receiving and positively engaging said twisted rope torsion bar; and an elastomeric thrust stop engaging said anchor nut so as to limit axial movement of said anchor nut and compress said twisted rope torsion bar when torque is applied;

whereby secure engagement is continously maintained between said end attachment and said twisted rope torsion bar to promote maximum torsional loading, and separation of said attachment assembly from said torsion bar is prevented.

* * * * *